(12) United States Patent
Hatfield

(10) Patent No.: US 6,659,028 B1
(45) Date of Patent: Dec. 9, 2003

(54) PLANTING DEVICE HAVING ADJUSTABLE HANDLE

(76) Inventor: Robert Lee Hatfield, 2272 Marconi Ave., Sacramento, CA (US) 95821

( * ) Notice: Subject to any disclaimer, the term of this patent is extended or adjusted under 35 U.S.C. 154(b) by 0 days.

(21) Appl. No.: 10/172,968

(22) Filed: Jun. 18, 2002

(51) Int. Cl.[7] .............................. A01B 45/02; A01C 5/02
(52) U.S. Cl. .......................................... 111/106; 111/95
(58) Field of Search ........................... 111/7.1, 7.3, 100, 111/106, 107, 108, 89, 92, 95, 98; 172/430; 294/50.8, 50.9

(56) References Cited

U.S. PATENT DOCUMENTS

| 537,525 A | 4/1895 | Gasser |
|---|---|---|
| 551,421 A | 12/1895 | Walter |
| 557,483 A | 3/1896 | Bryson |
| 2,165,821 A | 7/1939 | Twitchell |
| 2,230,846 A | 2/1941 | Pettett |
| 4,706,582 A | 11/1987 | Keskilohko .................... 111/4 |
| 5,052,314 A | 10/1991 | Leini ......................... 111/106 |

*Primary Examiner*—Robert E. Pezzuto
(74) *Attorney, Agent, or Firm*—Charles E. Baxley

(57) ABSTRACT

A planting device includes a housing for engaging into soil and having a rear and two side walls, and a pivotal jaw pivotally secured to the housing and rotatable toward and away from the rear wall of the housing. The pivotal jaw and the side walls and the rear wall of the housing form an enclosed peripheral portion for preventing the soil from entering into the housing when the pivotal jaw is moved away from the rear wall of the housing. A conduit is secured on top of the housing, a tube secured to the housing and the conduit, and a handle adjustably secured to the tube.

17 Claims, 5 Drawing Sheets

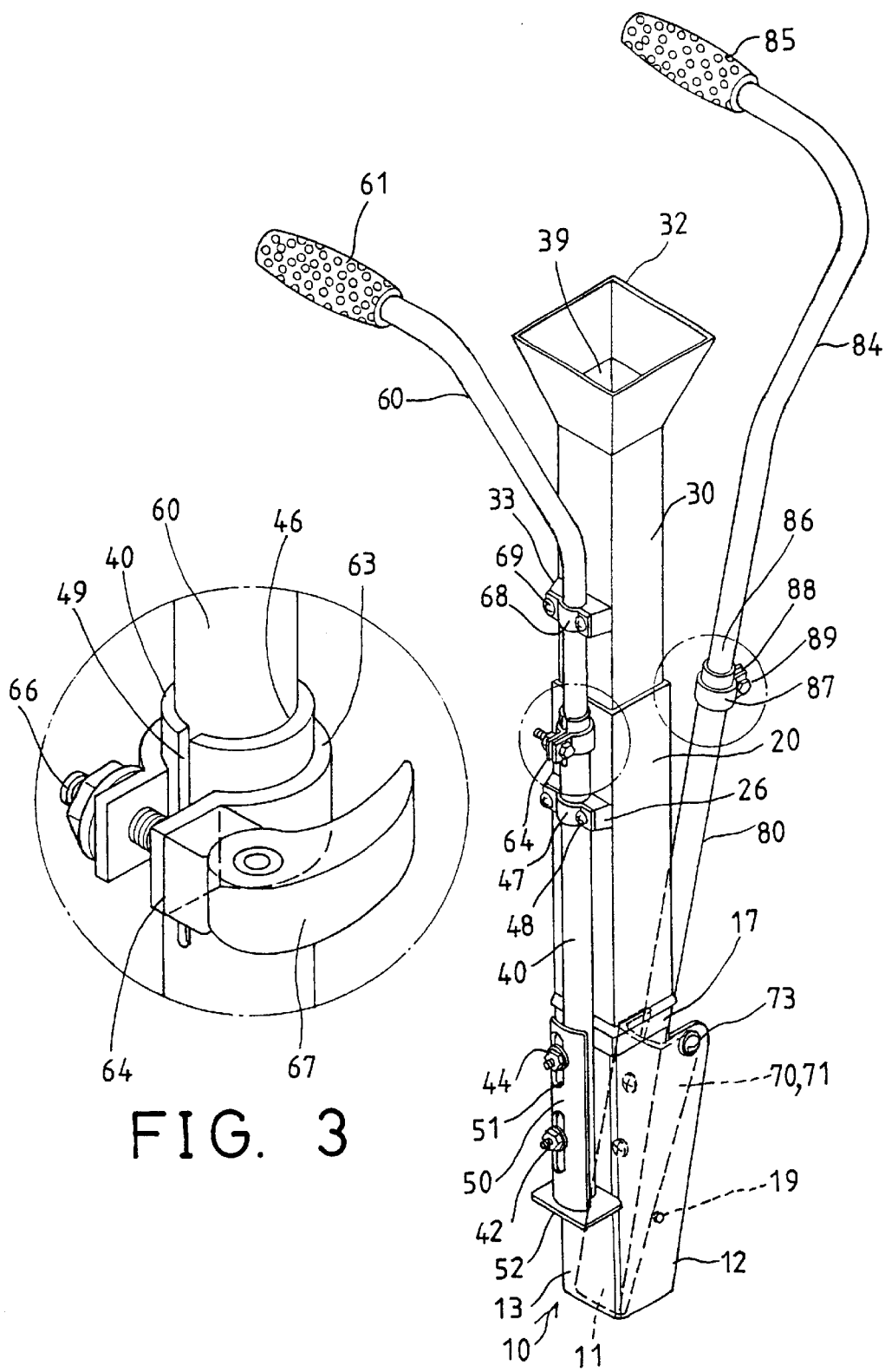

PLANTING DEVICE HAVING ADJUSTABLE HANDLE

BACKGROUND OF THE INVENTION

1. Field of the Invention

The present invention relates to a planting device, and more particularly to a planting device having an adjustable handle.

2. Description of the Prior Art

Various kinds of typical planting devices have been developed for transplanting plants, cabbages, or the like, or for fertilizing and drilling purposes. For example, U.S. Pat. No. 537,525 to Gasser, U.S. Pat. No. 551,421 to Walter, U.S. Pat. No. 557,483 to Bryson, U.S. Pat. No. 2,165,821 to Twitchell, and U.S. Pat. No. 2,230,846 to Pettett, etc., disclose several of the typical planting devices and comprise a pair of planting jaws or blades pivotally or rotatably secured to a housing or the like, for opening soil or the like. However, both the planting jaws or blades are pivotally or rotatably secured to the housing, such that the pivotal coupling of the planting jaws or blades to the housing may be become the weaker portions such that the planting jaws or blades may have a good chance to be disengaged from the housing after use. The planting device do not include a stronger jaw or blade for solidly engaging or digging into the soil.

U.S. Pat. No. 4,706,582 to Keskilohko, and U.S. Pat. No. 5,052,314 to Leini disclose two further typical planting devices and comprise a stronger and fixed jaw or blade for engaging or digging into the soil, and a movable planting jaw or blade pivotally or rotatably secured to the fixed jaw, for opening soil or the like. However, when the movable planting jaw or blade is rotated away from the fixed jaw, a widely opening may be formed between the fixed jaw and the movable jaw, such that the soil may have a good chance to move into the opening formed or defined between the fixed jaw and the movable jaw or blade, and such that the plants may not be erectly or suitably planted through the space or opening formed or defined between the fixed jaw and the movable jaw or blade.

In addition, the various kinds of typical planting devices include a handle that have a fixed length, and that may not be adjusted to different length according to the users' height, such that the taller users may have to bow their bodies and to place the plants into the lower planting tubes for transplanting or fertilizing and drilling purposes.

The present invention has arisen to mitigate and/or obviate the afore-described disadvantages of the conventional planting devices.

SUMMARY OF THE INVENTION

The primary objective of the present invention is to provide a planting device including a fixed and strong planting housing for solidly engaging and digging into the soil and for preventing the soil from entering into the Planting housing.

The other objective of the present invention is to provide a planting device including an adjustable handle that may not be adjusted to different length according to the users' height, for allowing the taller users to place the plants into the adjustable planting housing to transplant or fertilize and drill the soil without bowing their bodies.

The further objective of the present invention is to provide a planting device including a latch device for latching or locking the pivotal jaw to the planting housing after digging into and opening the soil, and for preventing the soil from entering into the planting is housing again, and for allowing the plants to be easily planted through the planting housing.

In accordance with one aspect of the invention, there is provided a planting device comprising a housing for engaging into soil, the housing including a rear wall, and two side walls for defining a chamber in the housing and for receiving a plant to be planted, and the housing including a bottom opening formed therein, and a pivotal jaw including an upper portion pivotally secured to the side walls of the housing, and including a lower portion rotatable toward and away from the rear wall of the housing, to move the soil out of the chamber of the housing when the lower portion of the pivotal jaw is moved away from the rear wall of the housing, for allowing the plant to be engaged into the chamber of the housing, and the pivotal jaw and the side walls and the rear wall of the housing forming and defining an enclosed peripheral portion for preventing the soil from entering into the chamber of the housing when the lower portion of the pivotal jaw is moved away from the rear wall of the housing.

A conduit is secured on top of the housing, and a tube is secured to the housing and the conduit, for securing the tube to the housing. At least one fastener is engaged through the tube and the rear wall of the housing, and a collar is engaged on the fastener and engaged in the tube for reinforcing the tube.

A handle is adjustably secured to the tube. A barrel is adjustably engaged in the conduit and secured to the handle. The tube includes an upper portion having a groove formed therein, a ring engaged onto the upper portion of the tube and having a pair of ears, and a fastener securing the ears together to secure the handle and the tube together.

A panel is adjustably secured to said tube and including a bottom portion, and a board is secured to said tube and spaced from a bottom portion of said housing, for determining an engagement of said housing into the soil.

A duct is secured to the pivotal jaw for rotating the pivotal jaw toward and away from the rear wall of the housing. A handle is adjustably secured to the duct. The duct includes an upper portion having a groove formed therein, a ring engaged onto the upper portion of the duct and having a pair of ears, and a fastener securing the ears together to secure the handle and the duct together.

One or more fasteners are engaged through the duct and the pivotal jaw, and a collar is engaged on the fastener and engaged in the duct for reinforcing the duct. One or more catches are extended from the housing and extended inward of the chamber of the housing for engaging with the pivotal jaw, and for retaining the pivotal jaw at an outward position.

Further objectives and advantages of the present invention will become apparent from a careful reading of a detailed description provided hereinbelow, with appropriate reference to accompanying drawings.

BRIEF DESCRIPTION OF THE DRAWINGS

FIG. 2 is a perspective view of the planting device;

FIG. 3 is an enlarged partial perspective view of the planting device;

DETAILED DESCRIPTION OF THE PREFERRED EMBODIMENT

Figure 1:
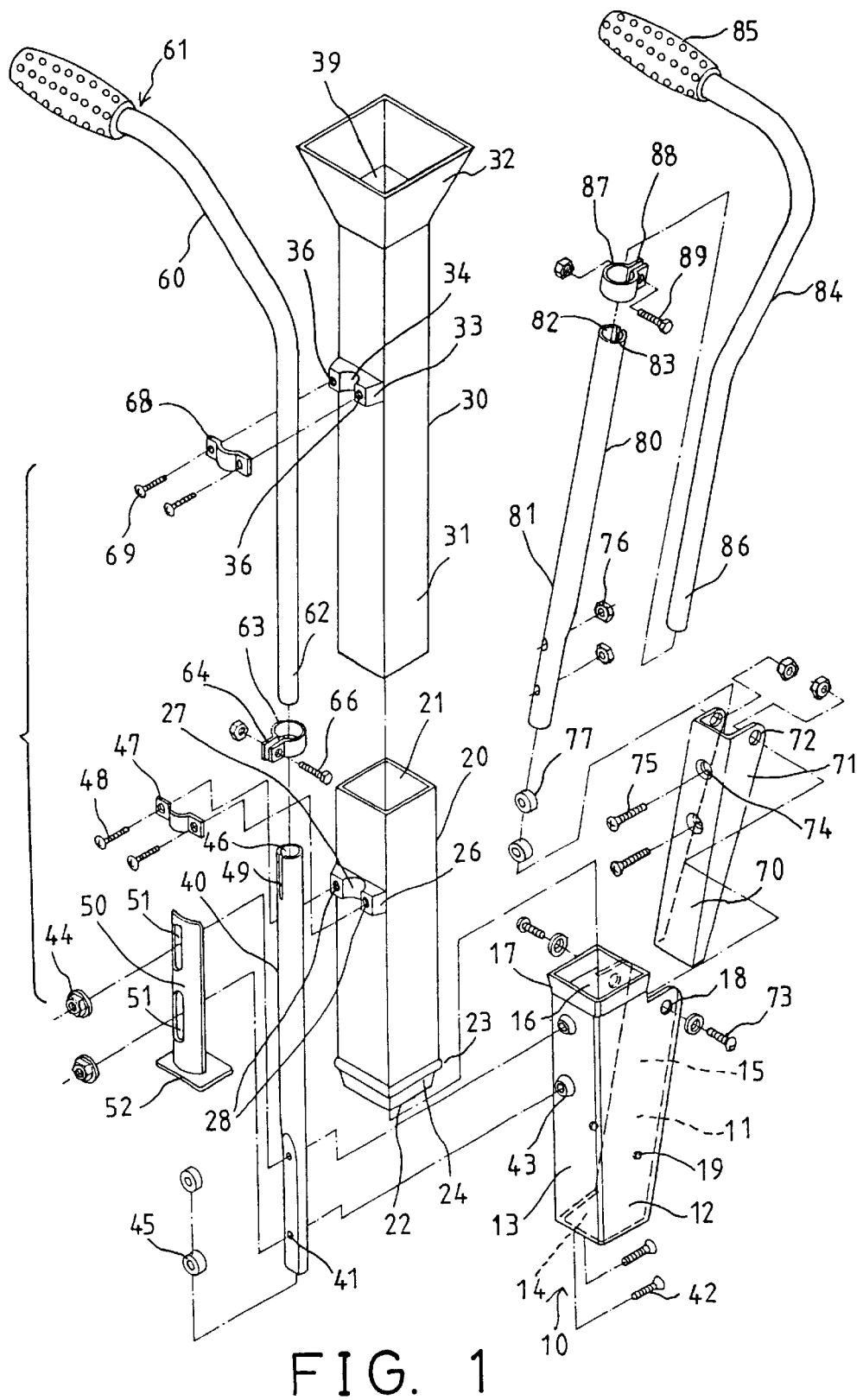
FIG. 1 is an exploded view of a planting device in accordance with the present invention.
Figure 4:
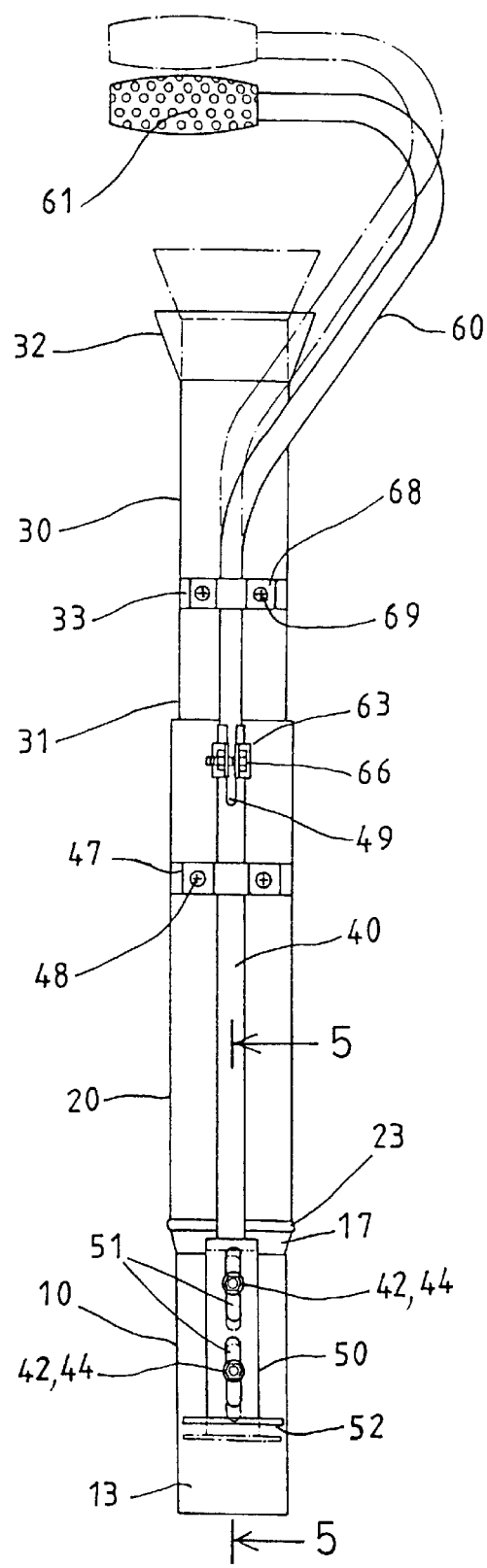
FIG. 4 is a rear view of the planting device.

Referring to the drawings, and initially to FIGS. 1–5, a planting device in accordance with the present invention comprises an excavating or planting housing 10 including a chamber 11 formed therein, and formed or defined by a pair of side walls 12 and a rear wall 13, and including a bottom opening 14 and a front opening 15 formed therein and communicating with the chamber 11 thereof, for allowing the housing 10 to be easily and solidly engaged into the soil. The housing 10 includes an orifice 16 formed and provided in the upper portion thereof, and formed and defined by a peripheral fence 17 which is preferably inclined upwardly and outwardly.

A conduit 20 includes a bore 21 formed therein, and includes a lower portion 22 engaged into the orifice 16 of the housing 10 and having an inclined outer peripheral surface 29 formed thereon (FIGS. 5, 6) for mating or engaging with the inclined peripheral fence 17 of the housing 10, and for allowing the conduit 20 to be solidly secured on top of the housing 10 with such as a force-fitted engagement. The conduit 20 preferably includes a peripheral rib 23 extended outward from the lower portion 22 thereof for forming or defining a peripheral shoulder 24 in the lower portion 22 thereof and for receiving or engaging with the peripheral fence 17 of the housing 10, and for further solidly securing the conduit 20 on top of the housing 10.

A barrel 30 has a lower portion 31 slidably received in the bore 21 of the conduit 20, and has a chute 32 provided on top thereof, for allowing the plant 90 (FIG. 6) to be planted to be easily engaged into the bore 39 of the barrel 30 via the chute 32. The plant 90 may then move through the bore 21 of the conduit 20, and then moved into the chamber 11 of the housing 10. The lower portion 22 of the conduit 20 is engaged in the orifice 16 of the housing 10, and the lower portion 31 of the barrel 30 is slidably engaged in the bore 21 of the conduit 20, such that the plant 90 may be stably guided to move through the bore 21 of the conduit 20 and then to move into the chamber 11 of the housing 10.

Figure 5:
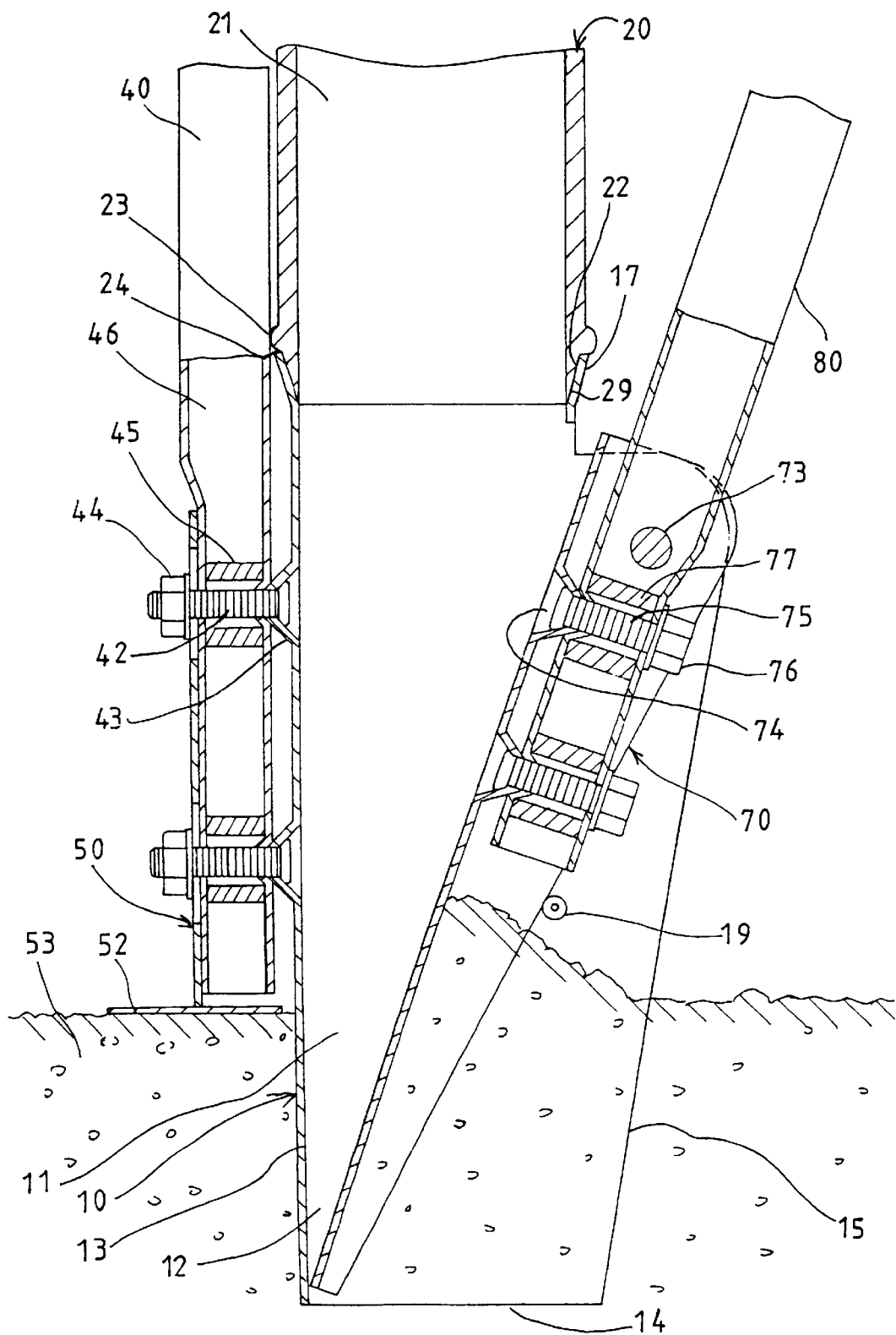
FIG. 5 is an enlarged partial cross sectional view taken along lines 5—5 of FIG. 4.
Figure 6:
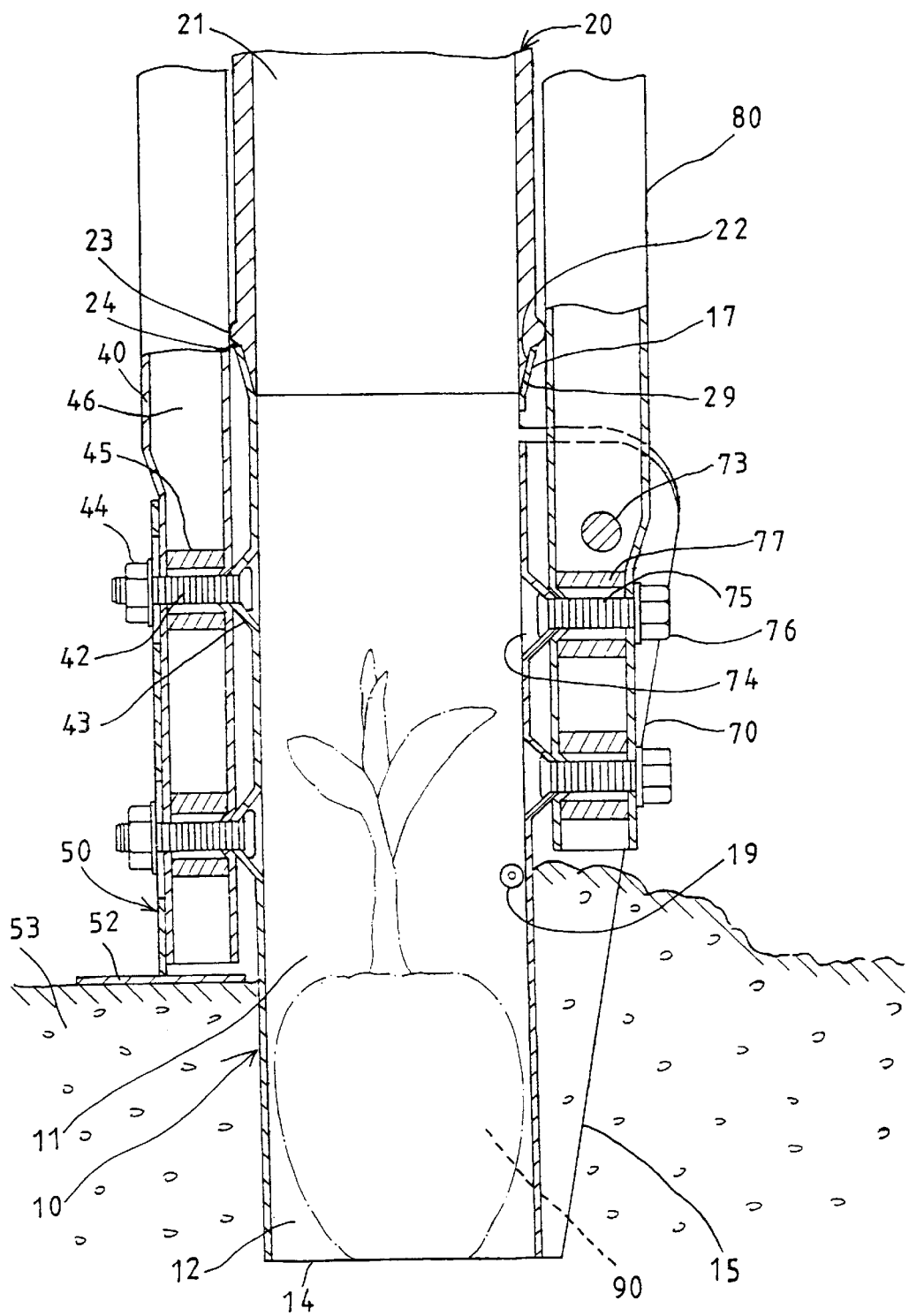
FIG. 6 is an enlarged partial cross sectional view similar to FIG. 5, illustrating the operation of the planting device.

A tube 40 includes one or more, such as two holes 41 formed in the lower portion thereof, for receiving fasteners 42 which may be threaded or engaged through the holes 43 of the rear wall 13 of the housing 10 and which may be threaded with lock nuts 44, in order to solidly secure the tube 40 to the housing 10. The tube 40 may thus be solidly secured to the housing 10, for facilitating the engagement of the housing 10 into the soil. As best shown in FIGS. 1, 5 and 6, one or more, such as two spacers or collars 45 are further provided and engaged onto the fasteners 42 respectively, and engaged in the lower portion of the tube 40, for increasing the strength of the tube 40, or for reinforcing the tube 40, and for preventing the tube 40 from being deformed or compressed by the fasteners 42.

The conduit 20 includes a seat 26 provided or extended from the rear portion thereof, and having a recess 27 formed therein for receiving the middle portion of the tube 40, and having one or more screw holes 28 formed therein, such as having two screw holes 28 formed or provided beside the recess 27 of the seat 26. A bracket 47 may be engaged onto the tube 40 and the seat 26, and one or more fasteners 48 may be engaged through the bracket 47 and threaded with the screw holes 28 of the seat 26, for solidly securing the tube 40 to the conduit 20, and thus for solidly securing the conduit 20 to the housing 10.

A panel 50 is further provided and includes one or more, such as two channels 51 formed therein for receiving the fasteners 42, and for allowing the panel 50 to be adjustably secured to the tube 40 and the housing 10. The panel 50 includes a board 52 attached to the bottom thereof, for engaging with the ground 53 (FIGS. 5, 6). The panel 50 may thus be adjusted relative to the tube 40 and the housing 10 to any required height by adjusting the fasteners 42 along the channels 51 of the panel 50 respectively and relatively. The distance between the board 52 and the bottom opening 14 of the housing 10 may be used to determine the engagement of the housing 10 into the soil or the ground 53, best shown in FIGS. 5 and 6.

The tube 40 includes a groove 49 (FIG. 1) formed in the upper portion thereof and communicating with the bore 46 thereof, for increasing the resilience or clampability of the tube 40. A handle 60 includes a hand grip 61 provided on top thereof, and includes a lower portion 62 slidably and adjustably received in the bore 46 of the tube 40. A ring 63 is engaged onto the upper portion of the the tube 40, and includes two ears 64 formed or provided thereon. A fastener 66 is engaged through the ears 64 for clamping the ring 63 and the handle 60 and the tube 40 together, and for allowing the handle 60 to be adjusted relative to the tube 40 to the required height. As shown in FIG. 3, a quick release lock 67 may further be provided and engaged with the fastener 66 and the ears 64 for quickly locking the tube 40 to the handle 60 with the ring 63.

The barrel 30 also includes a seat 33 provided or extended from the rear portion thereof, and having a recess 34 formed therein for receiving the middle portion of the handle 60, and having one or more screw holes 36 formed therein, such as having two screw holes 36 formed or provided beside the recess 34 of the seat 33. A bracket 68 may be engaged onto the handle 60 and the seat 33, and one or more fasteners 69 may be engaged through the bracket 68 and threaded with the screw holes 36 of the seat 33, for solidly securing the barrel 30 to the handle 60, and for adjustably securing the barrel 3 to the conduit 20 and to the handle 60.

The side walls 12 of the housing 10 each includes an aperture 18 formed in the upper portion thereof, and either or both of the side walls 12 each includes a catch 19 extended inward of the chamber 11 of the housing 10 from the middle or lower portion of the side walls 12 respectively. A pivotal jaw 70 includes two side fences 71 each having a hole 72 formed in the upper portion thereof and aligned with the apertures 18 of the side walls 12 of the housing 10, for receiving fasteners or pivot shafts 73, and for allowing the pivotal jaw 70 to be rotatably or pivotally secured to the housing 10.

The pivotal jaw 70 includes one or more orifices 74 formed therein for receiving fasteners 75. A duct 80 includes one or more, such as two holes 81 formed in the lower portion thereof, for receiving the fasteners 75 which may be threaded with lock nuts 76, in order to solidly secure the duct 80 to the pivotal jaw 70. The duct 80 may thus be solidly secured to the pivotal jaw 70, for rotating the pivotal jaw 70 relative to the housing 10. As best shown in FIGS. 1, 5 and 6, one or more, such as two spacers or collars 77 are further provided and engaged onto the fasteners 75 respectively, and engaged in the lower portion of the duct 80, for increasing the strength of the duct 80, or for reinforcing the duct 80, and for preventing the duct 80 from being deformed or compressed by the fasteners 75.

The duct 80 includes a groove 83 (FIG. 1) formed in the upper portion thereof and communicating with the bore 82 thereof, for increasing the resilience or clampability of the duct 80. Another handle 84 includes a hand grip 85 provided on top thereof, and includes a lower portion 88 slidably and adjustably received in the bore 82 of the duct 80. A ring 87 is engaged onto the upper portion of the the duct 80, and includes two ears 88 formed or provided thereon. A fastener 89 is engaged through the ears 88 for clamping the ring 87 and the handle 84 and the duct 80 together, and for allowing the handle 84 to be adjusted relative to the duct 80 to the required height. As shown in FIG. 3, the quick release lock 67 may also be provided and engaged with the fastener 88 and the ears 89 for quickly locking the duct 80 to the handle 84 with the ring 87.

In operation, the handle 60 may be adjustably secured to the barrel 30 with the bracket 68 and the fasteners 69, and may be adjustably secured to the tube 40 with the ring 63 and the fastener 66 and/or the quick release lock 67, such that the barrel 30 may be adjustably secured to the conduit 20 to any suitable height. In addition, the other handle 84 may also be adjustably secured to the duct 80 with the ring 87 and the fastener 89 and/or the quick release lock 67, such that the handles 60, 84 and the barrel 30 may be adjusted relative to the tube 40 and the duct 80 and the conduit 20 respectively, to the required height, according to the height of the users.

As shown in FIG. 5, the lower end of the pivotal jaw 70 may be rotated or moved to engage with the rear wall 13 of the housing 10, in order to enclose the bottom opening 14 of the housing 10, and for allowing the housing 10 and the pivotal jaw 70 to be engaged into the soil or the ground 53. The housing 10 and the pivotal jaw 70 include a solid structure, for allowing the housing 10 and the pivotal jaw 70 to be solidly and easily engaged into the soil 53. The board 52 may be engaged onto the soil or the ground 53 for limiting or determining the engagement of the housing 10 and the pivotal jaw 70 into the soil. The pivotal jaw 70 may then be rotated or moved away from the rear wall 13 of the housing 10 (FIG. 6), for moving or digging or excavating the soil out of the chamber 11 of the housing 10, and for allowing the plant 90 to be easily engaged into the bottom of the housing 10.

It is to be noted that, as shown in FIG. 5, the lower end of the pivotal jaw 70 may be forced against the rear wall 13 of the housing 10 when the housing 10 and the pivotal jaw 70 are engaged into the soil or the ground 53, such that the soil will not be engaged into the space defined between the rear wall 13 and the side walls 12 of the housing 10 and the pivotal jaw 70. As shown in FIG. 6, when the pivotal jaw 70 is rotated or moved away from the rear wall 13 of the housing 10 for excavating the soil out of the chamber 11 of the housing 10, the pivotal jaw 70 may be moved beyond the catches 19 which may then retain the pivotal jaw 70 at the outward rotating position as shown in FIG. 6, and may prevent the pivotal jaw 70 and the soil from entering into the chamber 11 of the housing 10.

It is further to be noted that the catches 19 may engage with the pivotal jaw 70, in order to retain the pivotal jaw 70 at the outward rotating position. The user thus need not use their hands to hold the handles 60, 84 together in order to prevent the pivotal jaw 70 and the soil from entering into the chamber 11 of the housing 10, such that the users may have their hands to easily load the plant 90 into the bore 39 of the barrel 30 via the chute 32. The pivotal jaw 70 and the rear wall 13 and the side walls 12 of the housing 10 may form an enclosed and solid peripheral portion for preventing the soil from entering into the chamber 11 of the housing 10, and for preventing the plant 90 from being tilted by the soil.

Accordingly, the planting device in accordance with the present invention includes a fixed and strong planting housing for solidly engaging and digging into the soil and for preventing the soil from entering into the planting housing, and includes an adjustable handle that may not be adjusted to different length according to the users' height, for allowing the taller users to place the plants into the adjustable planting housing to transplant or fertilize and drill the soil without bowing their bodies, and includes a latch device for latching or locking the pivotal jaw to the planting housing after digging into and opening the soil, and for preventing the soil from entering into the planting housing again, and for allowing the plants to be easily planted through the planting housing.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A planting device comprising:

a housing for engaging into soil, said housing including a rear wall, and two side walls for defining a chamber in said housing and for receiving a plant to be planted, and said housing including a bottom opening formed therein, a pivotal jaw including an upper portion pivotally secured to said side walls of said housing, and including a lower portion rotatable toward and away from said rear wall of said housing, to move the soil out of said chamber of said housing when said lower portion of said pivotal jaw is moved away from said rear wall of said housing, for allowing the plant to be engaged into said chamber of said housing, and said pivotal jaw and said side walls and said rear wall of said housing forming and defining an enclosed peripheral portion for preventing the soil from entering into said chamber of said housing when said lower portion of said pivotal jaw is moved away from said rear wall of said housing, and at least one catch extended from a first of said side walls of said housing and extended of said chamber of said housing for engaging with said pivotal jaw, and for retaining said pivotal jaw at an outward position.

2. The planting device according to claim 1 further comprising a conduit secured on top of said housing, and a tube secured to said housing and said conduit, for securing said tube to said housing.

3. The planting device according to claim 2 further comprising at least one fastener engaged through said tube and said rear wall of said housing, and a collar engaged on said at least one fastener and engaged in said tube for reinforcing said tube.

4. The planting device according to claim 1 further comprising a duct secured to said pivotal jaw for rotating said pivotal jaw toward and away from said rear wall of said housing.

5. A planting device comprising:

a housing for engaging into soil, said housing including a rear wall, and two side walls for defining a chamber in said housing and for receiving a plant to be planted, and said housing including a bottom opening formed therein, a pivotal jaw including an upper portion pivotally secured to said side walls of said housing, and including a lower portion rotatable toward and away from said rear wall of said housing, to move the soil out of said chamber of said housing when said lower portion of said pivotal jaw is moved away from said rear wall of said housing, for allowing the plant to be engaged into said chamber of said housing, and said pivotal jaw and said side walls and said rear wall of said housing forming and defining an enclosed peripheral portion for preventing the soil from entering into said chamber of said housing when said lower portion of said pivotal jaw is moved away from said rear wall of said housing, a conduit secured on top of said housing, and a tube secured to said housing and said conduit, for securing said tube to said housing, and a handle adjustably secured to said tube.

6. The planting device according to claim 5, wherein said tube includes an upper portion having a groove formed therein, a ring engaged onto said upper portion of said tube and having a pair of ears, and a fastener securing said ears together to secure said handle and said tube together.

7. The planting device according to claim 5 further comprising a barrel slidably and adjustably engaged in said conduit and secured to said handle.

8. A planting device comprising:

a housing for engaging into soil, said housing including a rear wall, and two side walls for defining a chamber in said housing and for receiving a plant to be planted, and said housing including a bottom opening formed therein, a pivotal jaw including an upper portion pivotally secured to said side walls of said housing, and including a lower portion rotatable toward and away from said rear wall of said housing, to move the soil out of said chamber of said housing when said lower portion of said pivotal jaw is moved away from said rear wall of said housing, for allowing the plant to be engaged into said chamber of said housing, and said pivotal jaw and said side walls and said rear wall of said housing forming and defining an enclosed peripheral portion for preventing the soil from entering into said chamber of said housing when said lower portion of said pivotal jaw is moved away from said rear wall of said housing, a conduit secured on top of said housing, and a tube secured to said housing and said conduit, for securing said tube to said housing, and a board secured to said tube and spaced from said bottom opening of said housing, for determining an engagement of said housing into the soil.

9. The planting device according to claim 8 further comprising a panel adjustably secured to said tube and including a bottom portion having said board secured thereto.

10. A planting device comprising:

a housing for engaging into soil, said housing including a rear wall, and two side walls for defining a chamber in said housing and for receiving a plant to be planted, and said housing including a bottom opening formed therein, a pivotal jaw including an upper portion pivotally secured to said side walls of said housing, and including a lower portion rotatable toward and away from said rear wall of said housing, to move the soil out of said chamber of said housing when said lower portion of said pivotal jaw is moved away from said rear wall of said housing, for allowing the plant to be engaged into said chamber of said housing, and said pivotal jaw and said side walls and said rear wall of said housing forming and defining an enclosed peripheral portion for preventing the soil from entering into said chamber of said housing when said lower portion of said pivotal jaw is moved away from said rear wall of said housing, a duct secured to said pivotal jaw for rotating said pivotal jaw toward and away from said rear wall of said housing, and a handle adjustably secured to said duct.

11. The planting device according to claim 10, wherein said duct includes an upper portion having a groove formed therein, a ring engaged onto said upper portion of said duct and having a pair of ears, and a fastener securing said ears together to secure said handle and said duct together.

12. A planting device comprising:

a housing for engaging into soil, said housing including a rear wall, and two side walls for defining a chamber in said housing and for receiving a plant to be planted, and said housing including a bottom opening formed therein, a pivotal jaw including an upper portion pivotally secured to said side walls of said housing, and including a lower portion rotatable toward and away from said rear wall of said housing, to move the soil out of said chamber of said housing when said lower portion of said pivotal jaw is moved away from said rear wall of said housing, for allowing the plant to be engaged into said chamber of said housing, and said pivotal jaw and said side walls and said rear wall of said housing forming and defining an enclosed peripheral portion for preventing the soil from entering into said chamber of said housing when said lower portion of said pivotal jaw is moved away from said rear wall of said housing, a duct secured to said pivotal jaw for rotating said pivotal jaw toward and away from said rear wall of said housing, and at least one fastener engaged through said duct and said pivotal jaw, and a collar engaged on said at least one fastener and engaged in said duct for reinforcing said duct.

13. A planting device comprising:

a housing for engaging into soil, and including a rear wall, a pivotal jaw including an upper portion pivotally secured to said housing, and including a lower portion rotatable toward and away from said rear wall of said housing, to move the soil away from said rear wall of said housing when said lower portion of said pivotal jaw is moved away from said rear wall of said housing, a conduit secured on top of said housing, a tube secured to said housing and said conduit, for securing said tube to said housing, and a first handle adjustably secured to said tube.

14. The planting device according to claim 13 further comprising a duct secured to said pivotal jaw, and a handle adjustably secured to said duct, for rotating said pivotal jaw toward and away from said rear wall of said housing.

15. The planting device according to claim 13 further comprising at least one fastener engaged through said tube and said rear wall of said housing, and a collar engaged on said at least one fastener and engaged in said tube for reinforcing said tube.

16. The planting device according to claim 13 further comprising a barrel slidably and adjustably engaged in said conduit and secured to said first handle.

17. The planting device according to claim 13 further comprising a panel adjustably secured to said tube and including a bottom portion, and a board secured to said tube and spaced from a bottom portion of said housing, for determining an engagement of said housing into the soil.

* * * * *